US012566628B2

(12) United States Patent
Sethi et al.

(10) Patent No.: US 12,566,628 B2
(45) Date of Patent: Mar. 3, 2026

(54) SYSTEM AND METHOD FOR MANAGING A MIGRATION OF A PRODUCTION ENVIRONMENT EXECUTING LOGICAL DEVICES

(71) Applicant: Dell Products L.P., Round Rock, TX (US)

(72) Inventors: Parminder Singh Sethi, Punjab (IN); Bing Liu, Tianjin (CN); Malathi Ramakrishnan, Madurai (IN)

(73) Assignee: Dell Products L.P., Round Rock, TX (US)

( * ) Notice: Subject to any disclaimer, the term of this patent is extended or adjusted under 35 U.S.C. 154(b) by 510 days.

(21) Appl. No.: 18/157,361

(22) Filed: Jan. 20, 2023

(65) Prior Publication Data

US 2024/0248751 A1 Jul. 25, 2024

(51) Int. Cl.
*G06F 9/54* (2006.01)
*G06F 9/48* (2006.01)

(52) U.S. Cl.
CPC ............ *G06F 9/4875* (2013.01); *G06F 9/542* (2013.01)

(58) Field of Classification Search
CPC ...... G06F 1/329; G06F 9/4843; G06F 9/4856; G06F 9/4881; G06F 9/4887
See application file for complete search history.

(56) References Cited

U.S. PATENT DOCUMENTS

| | | | | |
|---|---|---|---|---|
| 10,616,127 | B1 * | 4/2020 | Suit | H04L 47/70 |
| 10,915,349 | B2 * | 2/2021 | Ranjan | G06F 9/5077 |
| 2024/0095391 | A1 * | 3/2024 | Gordon | G06F 21/6227 |

* cited by examiner

*Primary Examiner* — Andy Ho

(74) *Attorney, Agent, or Firm* — Chamberlain, Hrdlicka, White, Williams & Aughtry; Aly Z. Dossa

(57) ABSTRACT

A method for managing a production environment includes obtaining container information associated with application containers in the production environment, in response to the obtaining: performing an attributes analysis on a set of data attributes of the container information to obtain an initial container grouping, assigning, based on the attributes analysis, a set of migration sensitivity tags to each of the application containers, generating a migration strategy based on the set of migration sensitivity tags, and initiating a migration of at least a portion of the application containers based on the migration strategy.

20 Claims, 4 Drawing Sheets

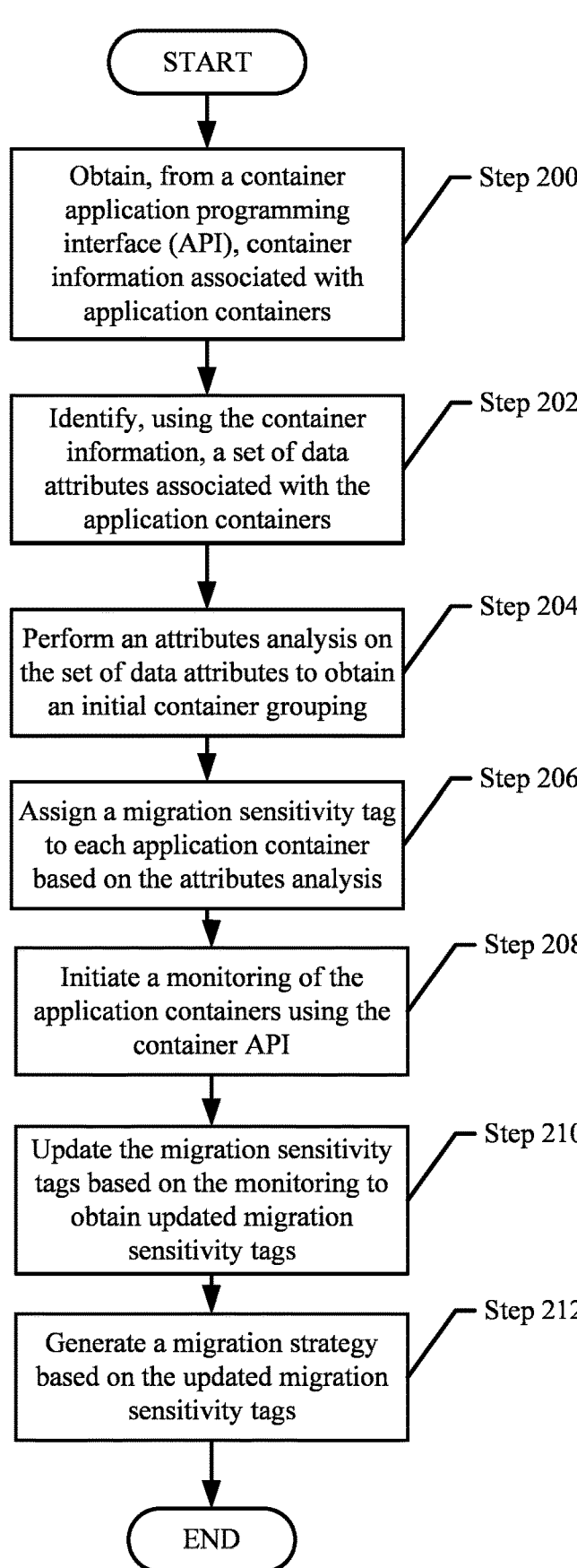

START

Obtain, from a container application programming interface (API), container information associated with application containers — Step 200

Identify, using the container information, a set of data attributes associated with the application containers — Step 202

Perform an attributes analysis on the set of data attributes to obtain an initial container grouping — Step 204

Assign a migration sensitivity tag to each application container based on the attributes analysis — Step 206

Initiate a monitoring of the application containers using the container API — Step 208

Update the migration sensitivity tags based on the monitoring to obtain updated migration sensitivity tags — Step 210

Generate a migration strategy based on the updated migration sensitivity tags — Step 212

END

FIG. 2

SYSTEM AND METHOD FOR MANAGING A MIGRATION OF A PRODUCTION ENVIRONMENT EXECUTING LOGICAL DEVICES

BACKGROUND

Computing devices in a system may include any number of hardware resources such as processors, memory, and persistent storage. The computing devices may utilize the hardware resources to host any number of application containers or virtual machines. The use of the hardware resources may impose a scarcity of resources on the computing devices. The introduction of additional application containers or virtual machines to the computing devices may exacerbate such scarcity.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2 shows a flowchart of a method for managing the migration of application containers in accordance with one or more embodiments of the invention.

DETAILED DESCRIPTION

Figure 1:
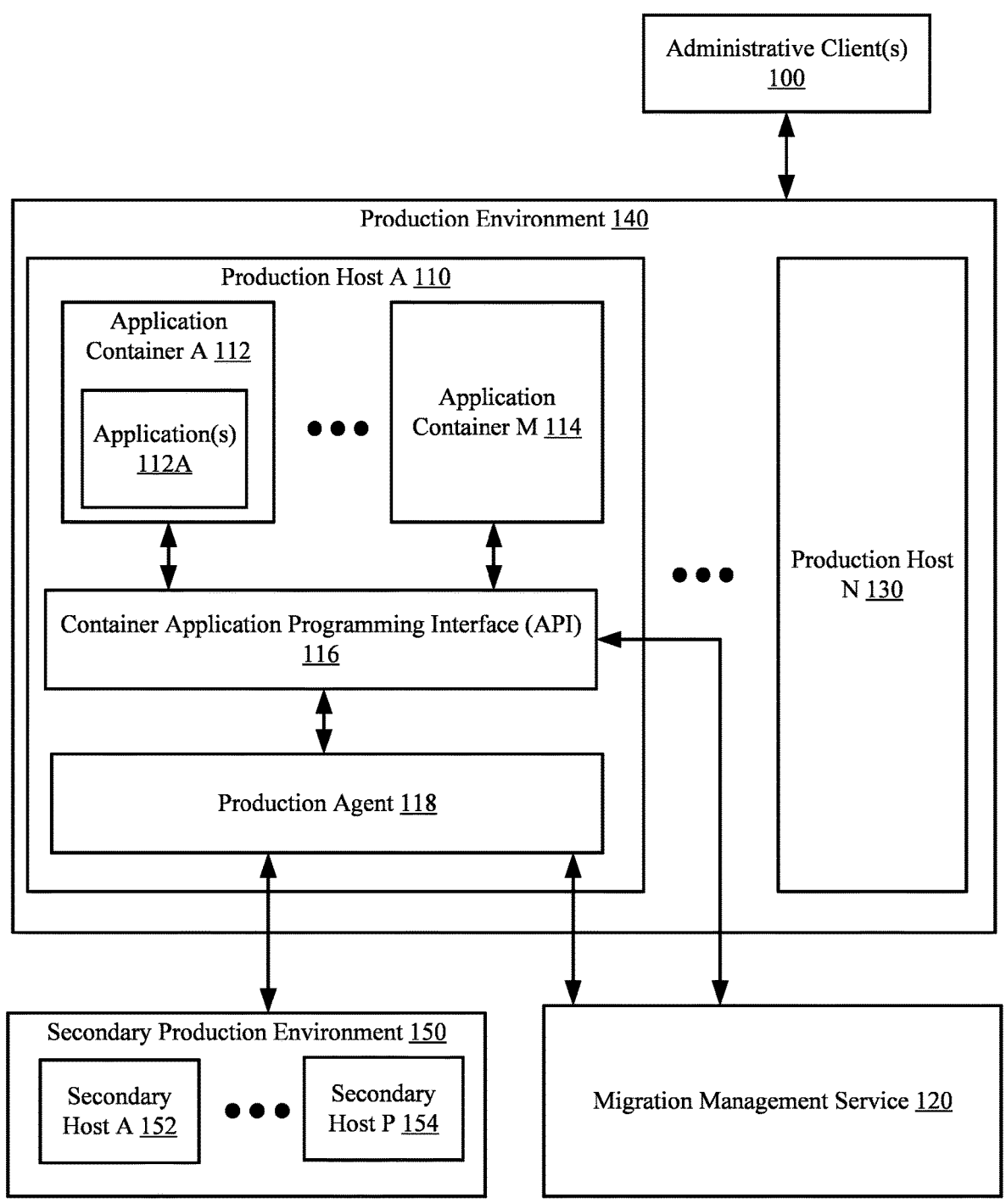
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing logical devices. Specifically, embodiments relate to methods and systems for managing a production environment that hosts logical devices such as, for example, virtual machines and application containers. The production host environment may include any number of production hosts that each execute a combination of application containers and/or virtual machines. The application containers and virtual machines may impose an operational burden on the hardware resources of the production hosts.

With a growing popularity of the use of application containers (also referred to herein as simply "containers"), demand for containers to be more available and scalable is increasing. A solution to this problem may include a swift migration of a container from one computing device (or environment) to another without obstructing operations of the applications in the application containers. There may be more than one migration method, each with its own set of advantages and disadvantages. One particular migration technique may better perform for certain type of applications. Thus, if a production environment is aware of the type of application(s) it is running, the best possible migration mechanism may be determined and implemented.

Embodiments disclosed herein include grouping application containers, application clusters, and/or application pods based on migration environment parameters that are used for strategic business requirements for a client utilizing the production environment.

The groupings of these logical devices (e.g., application containers) may be used to determine the replication to a migration site. The logical devices may be grouped based on parameters such as, for example, application criticality, resource availability, network bandwidth, cost, latency, distance, placement of replication sites, etc. The grouping and migration may be performed while meeting the expectations of the service-level agreement (SLA) and/or service-level objectives (SLOs) such as recovery time objectives (RPOs) or recovery point objectives (RPOs) determined by the clients.

Embodiments disclosed herein include obtaining runtime information of the container environment (e.g., of the workload cluster) using, for example, application programming interfaces (APIs). After obtaining the runtime information, the migration-sensitive containers are identified based on the obtained information. The containers are grouped based on the identified migration-sensitive containers. A prioritization may be performed within the containers in each grouping to determine the prioritized containers. After performing the grouping, the containers are monitored to determine the resource usage of the containers on the production environment.

Various embodiments of the invention are disclosed herein.

FIG. 1 shows an example system in accordance with one or more embodiments of the invention. The system includes a production environment (140), which includes any number of production hosts (110, 130), a secondary production environment (150), a migration management service (120), and any number of administrative clients (100). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production environment (140) includes production hosts (110, 130). Each production host (110, 130) may host one or more application containers (112, 114). The application containers (112, 114) may be logical entities virtualized, e.g., on an operating system (OS) level of the production hosts (110, 130) using computing resources (not shown) of the production hosts (110, 130). Each of the application containers (112, 114) may executed independently from other application containers (112, 114) in the production host (110, 130). The application containers (112, 114) may each host applications (112A). Each of the applications (112A) may be performing similar or different processes. In one or more embodiments of the invention, the applications (112A) provide services to users, e.g., clients (not shown). For example, the applications (112A) may host components. The components may be, for example, instances of databases, email servers, operating systems, and/or other components. The applications (112A) may host other types of components without departing from the invention. An application (112A) may be executed on one or more application containers (112, 114) as instances of the application.

In one or more embodiments, the application containers (112, 114) in the production environment (140) are grouped into workload clusters. The workload clusters may be a system of processes performed to service a goal of an entity (e.g., a corporate entity). The goal may be, for example, a business related workload. The business related workload may include servicing customers of the corporate entity. The workload cluster may be expected, at least by the entity, to operate within service level objectives (SLOs). In one or more embodiments, the workload cluster relies on dependencies between applications across application containers. For example, a first application may service the workload of a workload cluster using data generated by a second application. The second application may operate in a second application container different from the first application.

In one or more embodiments, if it is determined that the workload cluster may not operate within the SLOs, a solution to resolve the shortcoming includes migrating the application containers (112, 114), or a portion thereof, from the production environment (140) to a second production environment (150). The second production environment (150) may include any number of secondary hosts (152, 154). The secondary hosts (152, 154) may include functionality to perform similarly, or substantially similarly, to the production hosts (110, 130). Further, the secondary production environment (150) may include additional functionality without departing from the invention.

Figure 4:
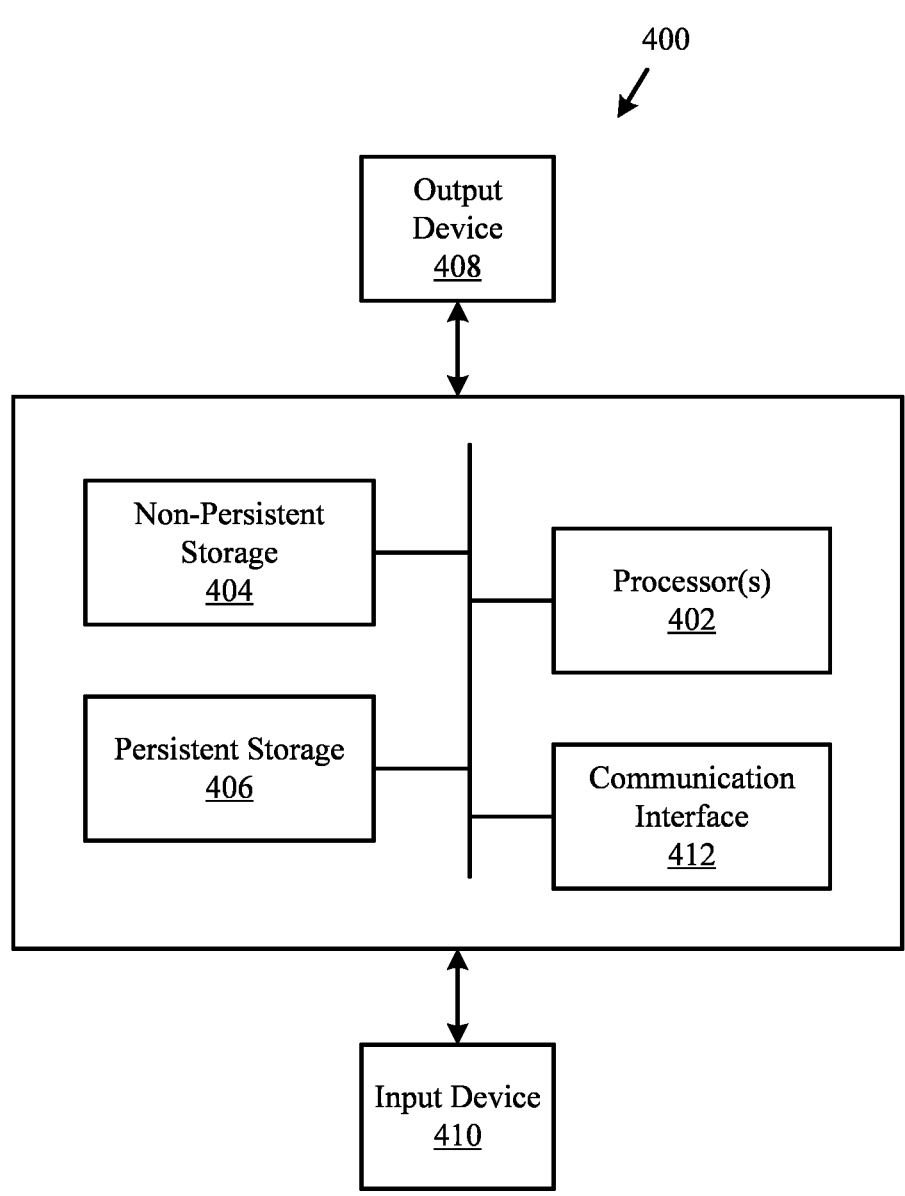
FIG. 4 shows a diagram of a computing device in accordance with one or more embodiments of the invention.

In one or more embodiments of the invention, the secondary hosts (152, 154) are implemented as computing devices (see e.g., FIG. 4). The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the secondary hosts (152, 154) described throughout this application and/or all, or a portion thereof, of the methods illustrated in FIG. 2.

In one or more embodiments of the invention, the secondary hosts (152, 154) are each implemented as a logical device. The logical device may utilize the computing resources of any number of computing devices and thereby provide the functionality of the secondary hosts (152, 154) described throughout this application and/or all, or a portion thereof, of the methods illustrated in FIG. 2.

In one or more embodiments of the invention, the application containers (112, 114) are implemented as computer instructions, e.g., computer code, stored on a persistent storage that when executed by a processor(s) of a computing device cause the computing device to provide the functionality of the application containers (112, 114) described throughout this application.

In one or more embodiments of the invention, the production hosts (110, 130) utilize container application programming interfaces (APIs) to obtain information regarding the workload clusters by monitoring the application containers (112, 114). The information obtained from the monitoring may be provided to the migration management service (120) and processed in accordance with FIG. 2.

In one or more embodiments of the invention, the container API (116) is implemented as computer code (e.g., software code) that enables the production host (110) to access information from the application containers (112, 114) and to provide the information to the migration management service (120).

In one or more embodiments of the invention, the production agent (118) includes functionality for executing the migration from the production environment (140) to the secondary production environment (150). The production agent (118) may perform the functionality as described, for example, in FIG. 2.

In one or more embodiments of the invention, the production agent (118) is implemented as computer instructions, e.g., computer code, stored on a persistent storage that when executed by a processor(s) of a computing device cause the computing device to provide the functionality of the production agent (118) described throughout this application.

In one or more embodiments of the invention, the migration management service (120) includes functionality for obtaining information from the container API (116) to determine a migration strategy for migrating the application containers (112, 114) from the production environment (140) to the secondary production environment (150). The migration management service (120) may determine the migration strategy in accordance with FIG. 2.

In one or more embodiments of the invention, the migration management service (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the migration management service (120) described throughout this application and/or all, or a portion thereof, of the methods illustrated in FIG. 2.

In one or more embodiments of the invention, the migration management service (120) is implemented as a logical device. The logical device may utilize the computing resources of any number of computing devices and thereby provide the functionality of the migration management service (120) described throughout this application and/or all, or a portion thereof, of the methods illustrated in FIG. 2.

In one or more embodiments of the invention, the production hosts (110, 130) are implemented as computing devices (see e.g., FIG. 4). The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (110, 130) described throughout this application and/or all, or a portion thereof, of the methods illustrated in FIG. 2.

In one or more embodiments of the invention, the production hosts (110, 130) are each implemented as a logical device. The logical device may utilize the computing resources of any number of computing devices and thereby provide the functionality of the production hosts (110, 130) described throughout this application and/or all, or a portion thereof, of the methods illustrated in FIG. 2.

While the system of FIG. 1 illustrates two production environments (i.e., 140, 150), the system may include additional production environments without departing from the invention.

FIG. 2 shows a flowchart in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2 may be performed in parallel with any other steps shown in FIG. 2 without departing from the scope of the invention.

FIG. 2 shows a flowchart of a method for managing the migration of application containers in accordance with one or more embodiments of the invention. The method shown in FIG. 2 may be performed by, for example, a migration management service (120, FIG. 1). Other components of the system illustrated in FIG. 1 may perform the method of FIG. 2 without departing from the invention.

Turning to FIG. 2, in step 200, container information is obtained. In one or more embodiments, the container information is obtained from one or more container APIs in the production environment. The container information may be the collective container information obtained from multiple application containers. In one or more embodiments, the container information includes workload cluster identifiers associated with each application containers, application container identifiers, an age of each application container, and a number of applications operating on each application containers. Other information may be included in the container information without departing from the invention.

In one or more embodiments, the container information is obtained in response to a request for migration of the application containers from a first production environment to a second production environment. For example, the first production environment may be a cloud environment, and the second production environment may be an on premise environment.

In step 202, a set of data attributes associated with the application containers is identified. In one or more embodiments of the invention, the set of data attributes is a portion of the container information that is deemed relevant for the migration of the application containers. The set of attributes may include, for example, an application identifier for each application of the application containers, a number of application containers, a shared storage volume used by the application containers, number of grouped application containers (e.g., per workload cluster), an age of each of the application containers, a status of each of the application containers, and a network latency for each of the application containers. Other attributes may be specified without departing from the invention.

In step 204, an attributes analysis is performed on the set of data attributes to obtain an initial container grouping. In one or more embodiments of the invention, the attributes analysis includes analyzing the set of attributes to determine any application dependencies between the applications and/or between any application containers. Using the application dependencies identified using the set of attributes, the applications (and/or application containers) may be grouped. For example, the application containers may be grouped into clusters (e.g., based on the workload clusters). Each workload cluster may include one or more nodes, each including pods of one or more application containers. The nodes may be grouped, for example, based on the production hosts hosting the application containers. The pods may be grouped based on the shared data used by the application containers. Alternatively, the pods may be grouped based on a criticality (or migration sensitivity) of the application containers. For example, application containers in a pod may be associated with a similar migration sensitivity. Other methods of grouping may be performed without departing from the invention.

In step 206, a migration sensitivity tag is assigned to each application container based on the attributes analysis. In one or more embodiments of the invention, the migration sensitivity tag is a value assigned to each application container based on the grouping performed in step 204. The migration sensitivity tag may be used to determine a level of migration sensitivity (e.g., low, medium, high) of an application container. Further, the migration sensitivity tag may be used to determine the grouping (e.g., the pod, cluster, node, etc.) associated with the application container.

In step 208, a monitoring of the application containers is initiated using the container APIs. In one or more embodiments of the invention, after the migration sensitivity tags are assigned and before the migration is initiated, the production environment is monitored for additional information regarding the application containers to be migrated. The monitoring may be performed using the container APIs. For example, the migration management service may send API commands to the container APIs to monitor the activity of the application containers. The result of this monitoring may be new information obtained from the container APIs.

In step 210, the migration sensitivity tags are updated based on the monitoring. In one or more embodiments, the migration sensitivity tags are updated by analyzing the new information obtained in step 208 to determine whether any of the migration sensitivity tags should be changed. For example, it may be determined during the monitoring of step 208 that additional application containers are to be included in a workload cluster. The migration sensitivity tags of the additional application containers may be updated to reflect such inclusion. In another example, it may be determined that one or more application containers in a workload cluster are no longer active, and, as such, are not required to be migrated. The migration sensitivity tags of such application containers may be updated to reflect a lower priority.

In step 212, a migration strategy is generated based on the updated migration sensitivity tags. In one or more embodiments of the invention, the migration strategy includes prioritizing an order of the application containers to migrate at least a portion of the application containers based on the updated set of sensitivity tags. For example the application containers may be migrated on a per-workload cluster basis, with the application containers within a workload cluster with the higher sensitivity tags migrated first. Alternatively, the application containers with the higher sensitivity tags may be migrated first without accounting for the grouping (e.g., the workload cluster). Other migration strategies may be generated without departing from the invention.

In one or more embodiments of the invention, the migration may be initiated by sending migration requests of the production agents that specify migrating the application containers in accordance with the determined migration strategy. The production agents may, in response to the migration requests, implement the migrations by copying the application containers (and any data associated therein), and migrating the copies to the secondary production environment.

EXAMPLE

Figure 3:
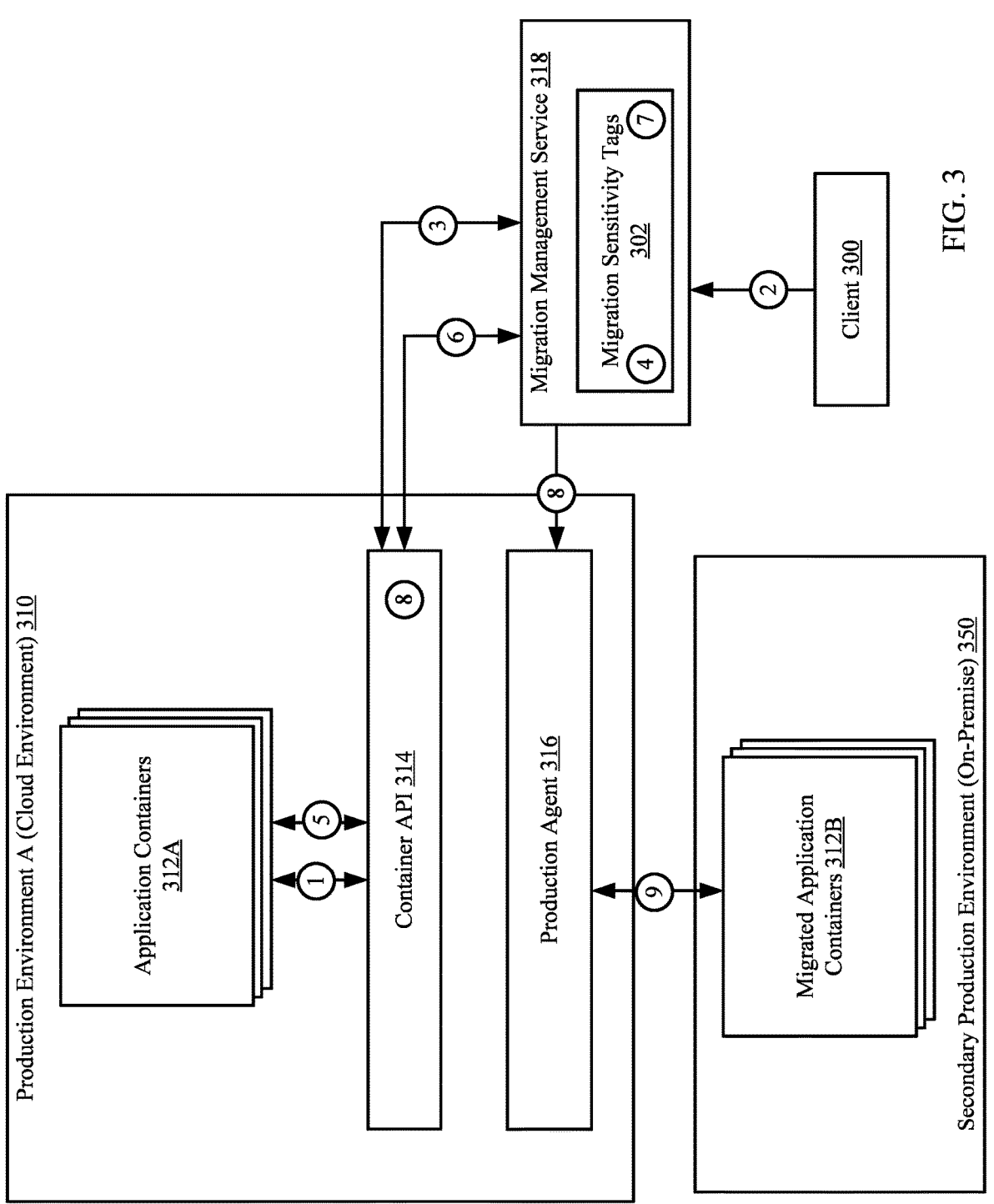
FIG. 3 shows an example in accordance with one or more embodiments of the invention.

The following section describes an example. The example, illustrated in FIG. 3, is not intended to limit the invention and is independent from any other examples discussed in this application. Turning to the example, consider a scenario in which a set of application containers in a cloud environment are to be migrated to a second production environment that is on premise to a corporate entity.

Turning to the example, FIG. 3 shows a diagram of an example system. For the sake of brevity, not all components of the example system may be illustrated in FIG. 3. The example system includes production environment A (310) (i.e., the cloud environment), a migration management service (318), a client (300), and a secondary production environment (350) (i.e., the on premise environment).

At a first point in time, a container API (314) of the cloud environment (310) monitors the runtime of the application containers (312A) [1]. The monitoring may be for container information associated with the application containers (312A). The container information specifies the workload clusters performed in the cloud environment (310), a status (e.g., active, failed, standby, etc.) of the application containers (312A), the age of each of the application containers, the total number of application containers (312A), and any other information without departing from the invention.

At a later point in time, the client (300) (operated by an administrator) sends a migration request for migrating the application containers (312A) to the on-premise environment (350) [2]. In response to the migration request, the migration management service (318) requests the container information from the container API (314). The container API (314) provides the container information to the migration management service (318) [3].

Based on the obtained container information, the migration management service (318) performs the method of FIG. 2 to generate a set of migration sensitivity tags (302) for the application containers (312A). Specifically, the migration management service (318) identifies the set of data attributes associated with each of the application containers (312A) and performs an attributes analysis on the set of attributes. The attributes analysis includes determining the workload cluster associated with each of the application containers (312A), determining the dependencies between the application containers (312A) based on the activity of each of the application containers (312A), the storage volumes used by each of the application containers (312A), and the network latency between application containers (312A). Based on the attributes analysis, the migration management service (318) generates a set of migration sensitivity tags (302) [4].

Following the generating of the migration sensitivity tags (302), the migration management service (318) initiates another monitoring of the application containers (312A)

using the container API (314) [5]. Following the monitoring, the container API (314) sends new container information to the migration management service (318) [6]. Using the new container information, the migration management service (318) generates updated migration sensitivity tags (302) [7].

Using the updated migration sensitivity tags (302), the migration management service (318) generates a migration strategy that specifies prioritizing the high migration sensitivity application containers. The migration strategy further specifies performing the migration on a per-workload cluster basis. After generating the migration strategy, the migration management service (318) sends a migration request to a production agent (316) of the production environment (310) [8]. The migration request specifies the migration strategy. The production agent (316), in response to obtaining the migration request, performs the migration in accordance with the migration strategy [9]. In this manner, the on premise environment (350) hosts the migrated application containers (312B). The migrated application containers (312B) are now equipped, using the resources of the on premise environment (350) to service the workload clusters.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the management of application containers by tailoring a migration strategy of the application containers based on the dependencies, workloads, activity, and the runtime of the application containers. By using container APIs to monitor the activity of the application containers, embodiments enable a migration management service to prioritize the more migration sensitive application containers. Such prioritization may benefit the overall performance of the production environment since the migration of an application container may impede the performance of the migrated application containers. By prioritizing the more sensitive application containers, embodiments disclosed herein reduce the risk and performance impedance that may be produced by a migration of a large number of application containers.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a production environment, comprising:
obtaining container information associated with application containers in the production environment;
in response to the obtaining:
performing an attributes analysis on a set of data attributes of the container information to obtain an initial container grouping,
wherein the initial container grouping is obtained based on: dependencies between the application containers based on the container information, a workload cluster associated with each application container in the application containers, a storage volume used by each application container in the application containers, and a network latency between the application containers;
assigning, based on the attributes analysis, a set of migration sensitivity tags to each of the application containers;
generating a migration strategy based on the set of migration sensitivity tags and based on the workload cluster associated with each application container; and
initiating a migration of at least a portion of the application containers based on the migration strategy,
wherein the at least a portion of the application containers are associated with the workload cluster and associated with a same migration sensitivity tag.

2. The method of claim 1, wherein the container information is obtained from a container application programming interface (API).

3. The method of claim 1, further comprising:
after the assigning, monitoring the application containers to obtain new container information; and
updating the set of migration sensitivity tags to obtain an updated set of migration sensitivity tags, wherein the migration strategy is further based on the updated set of migration sensitivity tags.

4. The method of claim 3, wherein the monitoring is performed by a container application programming interface (API).

5. The method of claim 1, wherein the set of migration sensitivity tags comprise at least one of: a high sensitivity tag, a medium sensitivity tag, and a low sensitivity tag.

6. The method of claim 5, wherein the migration strategy comprises prioritizing an order of the application containers to migrate a portion of the application containers based on the set of sensitivity tags.

7. The method of claim 1, further comprising:
identifying the set of data attributes using the container information,
wherein the set of data attributes comprises: an application identifier for each application of the application containers, a number of containers, a number of grouped application containers, an age of each of the application containers, a status of each of the application containers, and a network latency for each of the application containers.

8. A non-transitory computer readable medium comprising computer readable program code, which when executed by a computer processor enables the computer processor to perform a method for managing a production environment, the method comprising:
obtaining container information associated with application containers in the production environment;
in response to the obtaining:
performing an attributes analysis on a set of data attributes of the container information to obtain an initial container grouping,
wherein the initial container grouping is obtained based on: dependencies between the application containers based on the container information, a workload cluster associated with each application container in the application containers, a storage volume used by each application container in the application containers, and a network latency between the application containers;
assigning, based on the attributes analysis, a set of migration sensitivity tags to each of the application containers;
generating a migration strategy based on the set of migration sensitivity tags and based on the workload cluster associated with each application container; and
initiating a migration of at least a portion of the application containers based on the migration strategy,
wherein the at least a portion of the application containers are associated with the workload cluster and associated with a same migration sensitivity tag.

9. The non-transitory computer readable medium of claim 8, wherein the container information is obtained from a container application programming interface (API).

10. The non-transitory computer readable medium of claim 8, further comprising:
after the assigning, monitoring the application containers to obtain new container information; and
updating the set of migration sensitivity tags to obtain an updated set of migration sensitivity tags,
wherein the migration strategy is further based on the updated set of migration sensitivity tags.

11. The non-transitory computer readable medium of claim 10, wherein the monitoring is performed by a container application programming interface (API).

12. The non-transitory computer readable medium of claim 8, wherein the set of migration sensitivity tags comprise at least one of: a high sensitivity tag, a medium sensitivity tag, and a low sensitivity tag.

13. The non-transitory computer readable medium of claim 12, wherein the migration strategy comprises prioritizing an order of the application containers to migrate a portion of the application containers based on the set of sensitivity tags.

14. The non-transitory computer readable medium of claim 8, further comprising:

identifying the set of data attributes using the container information, wherein the set of data attributes comprises: an application identifier for each application of the application containers, a number of containers, a number of grouped application containers, an age of each of the application containers, a status of each of the application containers, and a network latency for each of the application containers.

15. A system, comprising:

a production environment;

a processor; and memory comprising instructions, which when executed by the processor, perform a method for managing the production environment, the method comprising:

obtaining container information associated with application containers in the production environment;

in response to the obtaining:

performing an attributes analysis on a set of data attributes of the container information to obtain an initial container grouping, wherein the initial container grouping is obtained based on: dependencies between the application containers based on the container information, a workload cluster associated with each application container in the application containers, a storage volume used by each application container in the application containers, and a network latency between the application containers;

assigning, based on the attributes analysis, a set of migration sensitivity tags to each of the application containers;

generating a migration strategy based on the set of migration sensitivity tags and based on the workload cluster associated with each application container; and initiating a migration of at least a portion of the application containers based on the migration strategy, wherein the at least a portion of the application containers are associated with the workload cluster and associated with a same migration sensitivity tag.

16. The system of claim 15, wherein the container information is obtained from a container application programming interface (API).

17. The system of claim 15, further comprising:

after the assigning, monitoring the application containers to obtain new container information; and updating the set of migration sensitivity tags to obtain an updated set of migration sensitivity tags, wherein the migration strategy is further based on the updated set of migration sensitivity tags.

18. The system of claim 17, wherein the monitoring is performed by a container application programming interface (API).

19. The system of claim 15, wherein the set of migration sensitivity tags comprise at least one of: a high sensitivity tag, a medium sensitivity tag, and a low sensitivity tag.

20. The system of claim 15, further comprising:

identifying the set of data attributes using the container information, wherein the set of data attributes comprises: an application identifier for each application of the application containers, a number of containers, a number of grouped application containers, an age of each of the application containers, a status of each of the application containers, and a network latency for each of the application containers.

\* \* \* \* \*